United States Patent

[11] 3,616,246

| [72] | Inventor | Edward Cherry<br>Frederick, Md. |
|---|---|---|
| [21] | Appl. No. | 392,374 |
| [22] | Filed | Aug. 24, 1964 |
| [45] | Patented | Oct. 26, 1971 |
| [73] | Assignee | The United States of America as represented by the Secretary of the Army |

[54] USE OF ABSORPTIVE MATERIALS FOR THE PRODUCTION OF FUNGUS SPORES
3 Claims, No Drawings

| [52] | U.S. Cl. ........ | 195/81, 195/116 |
|---|---|---|
| [51] | Int. Cl. ........ | C12b 1/00 |
| [50] | Field of Search ........ | 195/80, 81, 96, 101, 102, 120, 116 |

[56] References Cited
UNITED STATES PATENTS

| 2,850,841 | 9/1958 | Szuecs............. | 195/81 X |
|---|---|---|---|
| 3,000,791 | 9/1961 | Schweiger........ | 195/81 X |
| 3,011,948 | 12/1961 | Gaeumann et al.... | 195/81 X |
| 3,013,946 | 12/1961 | Lumb et al........ | 195/81 X |

*Primary Examiner*—Carl D. Quarforth
*Assistant Examiner*—Stephen J. Lechert, Jr.
*Attorneys*—Harry M. Saragovitz, Edward J. Kelly and Herbert Berl

CLAIM: 1. In a process for the production of fungus spores comprising; inoculating a medium with fungus spores, aerobically incubating the inoculated medium until a maximum amount of fungal mycelia are produced, the improvement comprising recovery of said mycelia from said medium, and placing of a layer of said mycelia upon a moistened absorptive surface, incubating at a temperature of about 25° to 30° C. and at a relative humidity of about 90 to 98 percent for a period of 1 to 4 days to achieve maximum sporulation, drying the spore containing substrate, and recovering said spores therefrom.

USE OF ABSORPTIVE MATERIALS FOR THE PRODUCTION OF FUNGUS SPORES

The invention described herein may be manufactured and used by or for the Government of the United States of America for governmental purposes without the payment to me of any royalty thereon.

This invention relates to a process of producing fungus spores, and constitutes an improvement over the process disclosed in my copending application, Ser. No. 370,380, filed 26 May 1964.

The spore form of various fungi causes crop diseases such as cereal rusts, caused by various rust fungi, and rice blast, caused by *Piricularia oryzae*. In order to study these and other diseases, it was necessary to find processes suitable for producing the fungus spores in quantities suitable for testing. In copending application, Ser. No. 370,380, there is disclosed an effective surface culture method of producing fungus spores which involves incubating the fungus upon a steeped grain substrate and recovering the spores produced thereby. While the process disclosed in my copending application is a satisfactory method of producing fungus spores, it is a lengthy process requiring approximately 5 days from inoculation of the substrate until maximum sporulation has occurred. It is an object of this invention therefore to provide a process for producing fungus spores which requires less time from substrate inoculation until maximum sporulation.

In general, the process of this invention comprises producing fungal mycelia in a liquid culture medium spreading the mycelia in a thin layer upon an absorptive surface, incubating the fungus upon said surface until maximum sporulation has occurred, and recovering the spores so produced from said surface.

The first step comprises producing the fungal mycelium in a liquid culture medium. This may be accomplished by conventional means such as in shake flasks or in aerated and agitated fermentors. The liquid medium, such as a dextrose-yeast extract medium, is inoculated with spores of fungus. After several days of incubation, many mycelia but no spores are produced in the medium.

The mycelia are removed from the nutrient solution by filtration. The mycelia may be washed with sterile distilled water, or employed with the residuum of the medium still present.

The mycelia are next spread in a thin layer upon an absorptive surface. Suitable absorptive surfaces that may be employed include cloth, cellulose sponge, cheesecloth, polyurethane foam, turkish toweling, felt, sintered stainless steel, sintered glass, porous silica blocks, and others. The mycelia may be placed upon the absorptive surface by any conventional method such as troweling, dipping, and filtering. The thickness of the mycelial layer is not critical, although a relatively thin layer is preferred.

When the absorptive substrate is relatively thick, it should be saturated with sterile distilled water prior to the step of applying the mycelia to prevent them from drying out. If the substrate is relatively thin, a portion of it is placed into a reservoir of water to keep it moist during the incubation period.

The mycelia are incubated upon the substrate at a temperature of about 25° to 30° C. and at a relative humidity of about 90–98 percent. Spores will appear upon the mycelium after about 24 hours of incubation. Maximum sporulation will have occurred within 1 to 4 days, depending upon the spore-producing capability of the particular fungus. With some fungi, such as *P. oryzae*, it may be desirable to lower the humidity to which the mycelia are exposed at some point during the incubation to stimulate and accelerate sporulation.

The substrate with the spore-laden mycelia is dried at about 40° C. to reduce the moisture content of the spores to below 10 percent by weight preferably about 5–8 percent. The drying time should not exceed about 48 hours and the temperature should not exceed about 104° F. to prevent deleteriously affecting the spore.

After drying, the spores are ready to be removed from the substrate. This removal may be accomplished either mechanically or by nonaqueous solvent washing, as disclosed in copending application Ser. No. 370,380.

The following examples illustrate the described process used in growing the spores of *Piricularia oryzae*, the rice blast fungus. It is to be understood that these are examples only, and not limiting upon the production of *P. oryzae*, or any other fungus.

EXAMPLE I

A medium is prepared consisting of 15 grams of dextrose and 3 grams of yeast extract (Difco) per liter of water. Three liters of this medium are placed into a 4 liter Pyrex glass bottle, and 1 ml. of an antifoaming agent such as mineral oil or lard oil added thereto. The glass bottle is then fitted with a 3 hole rubber stopper having an air supply tube, air exhaust tube and inoculating tube. The air supply tube extends down into the medium, terminating near the bottom of the bottle. A cotton-wool filter is provided for filtering the air supply prior to its introduction into the bottle. A valve is also provided to control the air flow rate. The air exhaust tube is covered with cotton-wool at its exhaust end. The inoculating tube extends down to a point above the surface of the medium and is fitted with a serum cap on the end external to the bottle. The fermenting apparatus just described, containing the dextrose-yeast extract medium, is sterilized by autoclaving for 30 minutes at 15 p.s.i. Before sterilizing, the valve in the air supply area is closed with a screw clamp to prevent evaporated medium from wetting the air supply filter. The cotton-wool covering the exit end of the air exhaust tube is overlaid with paper to prevent wetting during sterilization. After completion of the sterilization step, the apparatus is cooled to room temperature and the medium contained therein is inoculated with 10 ml. of an aseptically prepared suspension of spores of *Piricularia oryzae*.

The suspension should contain at least 5,000 spores per ml. The inoculated medium is aerated at a rate of 900 ml. per minute. The incubation is carried out at a temperature of 28° C. for 72 hours. At the end of the incubation period, much mycelia are produced, but no spores. The mycelia are recovered from the medium by passing the fermentation beer through a Buchner funnel. The mycelia so collected are then spread upon polyurethane foam pads which have been previously saturated with water, and which are resting in a pan of water. The incubation of the mycelia upon the foam pads is effected at a temperature of 25° C. and a relative humidity of 96–98 percent for a period of time sufficient for maximum sporulation to occur, usually 48 to 96 hours. At the end of this period of time the mycelia will have sporulated. The sporulated material is dried at 40° C. for 24 hours. The spores are recovered either by vacuum suction and cyclone separator or bag filter, or by nonaqueous solvent washing. The latter is the preferred method since the yield of viable spores is higher. The preferred solvent is 1,1,1 trichloroethane because of its low toxicity and nonflammability. The spores are recovered from the nonaqueous solvent by filtration, and the filter cake dried at 40° C. The dried cake is then passed through a 16 mesh screen to yield a dry powder having a moisture content of about 3 percent by weight.

EXAMPLE II

The procedure of example 1 is followed except that turkish toweling is used instead of polyurethane foam pads as the substrate upon which sporulation of the mycelia is effected. The mycelia are placed upon the toweling by dipping it into the beer and then withdrawing it therefrom, causing mycelium to cling to its surface.

While the foregoing specific examples are directed to producing spores of *P. oryzae*, it is obvious that the process of this invention may be employed to obtain the spores of other fungi. The process is useful in obtaining spores of *Penicillium* species. *Aspergillus* species, *Helminthosporium* species, and others.

The process of this invention is useful in producing spores for use in antibiotic production, food supplement production, allergin preparation and fungal genetics research as well as for use in plant pathology studies.

I claim:

1. In a process for the production of fungus spores comprising: inoculating a medium with fungus spores, aerobically incubating medium until a maximum amount of fungal mycelia are produced the improvement comprising recovery of said mycelia from said medium, and placing of a layer of said mycelia upon a moistened absorptive surface, incubating at a temperature of about 25°–30° C. and at a relative humidity of about 90–98 percent for a period of 1 to 4 days to achieve maximum sporulation, drying the spore containing substrate, and recovering said spores therefrom.

2. A process in accordance with claim 1 wherein the fungus spores are selected from the group consisting of *Penicillium*, *Aspergillum*, and *Helminthosporium*.

3. A process in accordance with claim 1 wherein the absorptive surface is selected from the group consisting of cloth, cellulose sponge, polyurethane foam, felt, sintered stainless steel, sintered glass and porous silica blocks.

* * * * *